US011486967B2

(12) United States Patent
Hasselbach

(10) Patent No.: US 11,486,967 B2
(45) Date of Patent: Nov. 1, 2022

(54) MODULE FOR A LIDAR SENSOR AND LIDAR SENSOR

(71) Applicant: Robert Bosch GmbH, Stuttgart (DE)

(72) Inventor: Juergen Hasselbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 559 days.

(21) Appl. No.: 16/681,965

(22) Filed: Nov. 13, 2019

(65) Prior Publication Data

US 2020/0158827 A1 May 21, 2020

(30) Foreign Application Priority Data

Nov. 15, 2018 (DE) .................... 102018219481.5

(51) Int. Cl.
*G01S 17/18* (2020.01)
*G02B 26/08* (2006.01)
*G01S 7/481* (2006.01)
*G01S 17/08* (2006.01)

(52) U.S. Cl.
CPC ............ *G01S 7/4811* (2013.01); *G01S 17/08* (2013.01); *G02B 26/0816* (2013.01)

(58) Field of Classification Search
CPC . G02B 26/101; G02B 26/0816; G01S 7/4817; G01S 17/42; G01S 17/08; G01S 7/4814; G01S 7/4811
See application file for complete search history.

(56) References Cited

U.S. PATENT DOCUMENTS

| 9,653,001 | B2* | 5/2017 | Mughal | G09B 19/167 |
| 10,198,639 | B2* | 2/2019 | Sung | B60R 1/00 |
| 10,281,721 | B2* | 5/2019 | Bhalla | G02B 27/01 |
| 10,816,649 | B1* | 10/2020 | Keyser | G01J 4/02 |
| 10,924,679 | B2* | 2/2021 | Lee | G06V 20/597 |
| 11,175,388 | B1* | 11/2021 | Wood | G01S 17/34 |
| 11,228,370 | B2* | 1/2022 | Danesh | H04B 10/112 |
| 2011/0066399 | A1* | 3/2011 | Mahajan | G01C 3/08 |
| | | | | 356/3.01 |
| 2012/0105825 | A1* | 5/2012 | Gogol | G01C 15/002 |
| | | | | 356/8 |
| 2012/0215403 | A1* | 8/2012 | Tengler | B60K 35/00 |
| | | | | 701/36 |

(Continued)

FOREIGN PATENT DOCUMENTS

DE 102016113909 A1 2/2018
WO 2014095105 A1 6/2014

*Primary Examiner* — Tsion B Owens
(74) *Attorney, Agent, or Firm* — Norton Rose Fulbright US LLP; Gerard Messina

(57) ABSTRACT

A module for a lidar sensor, including: a light-transmitting path having a movable mirror and a light source; and a transmitting-side microlens set-up, which is situated downstream from the light transmitting path; the light transmitting path being configured to illuminate a first microlens of the microlens set-up on the input side, using a first spot of a predefined diameter of a first light beam; the predefined diameter of the spot of the first light beam being greater than a diameter of the first microlens, and a distance of an edge of the first microlens to edges of adjacent microlenses inside of the transmitting-side microlens set-up corresponding to a difference between the predefined diameter of the spot of the first light beam and the diameter of the first microlens.

10 Claims, 4 Drawing Sheets

(56) References Cited

U.S. PATENT DOCUMENTS

| | | | | |
|---|---|---|---|---|
| 2014/0292828 A1* | 10/2014 | Yasumoto | ............... | B60K 37/02 345/204 |
| 2015/0010207 A1* | 1/2015 | Inada | ..................... | G06F 3/012 382/103 |
| 2015/0098075 A1* | 4/2015 | Bestler | .................. | G01S 7/4817 356/3.01 |
| 2015/0235398 A1* | 8/2015 | Kim | .................... | G09B 29/003 345/633 |
| 2016/0163108 A1* | 6/2016 | Kim | .................. | G02B 27/0179 345/633 |
| 2017/0168160 A1* | 6/2017 | Metzler | .................. | G01S 17/86 |
| 2017/0187963 A1* | 6/2017 | Lee | ........................ | G06V 20/56 |
| 2017/0269684 A1* | 9/2017 | Murai | ....................... | B60R 1/00 |
| 2018/0037116 A1* | 2/2018 | Avery | .................... | B60K 35/00 |
| 2018/0239136 A1* | 8/2018 | Ishikawa | ................ | G06F 3/013 |
| 2018/0329061 A1 | 11/2018 | Pacala et al. | | |
| 2020/0389232 A1* | 12/2020 | Danesh | ............. | H04B 10/1123 |

* cited by examiner

MODULE FOR A LIDAR SENSOR AND LIDAR SENSOR

FIELD OF THE INVENTION

The present invention relates to a module for a lidar sensor, as well as to a lidar sensor.

BACKGROUND INFORMATION

Laser scanner systems, such as lidar sensors, may be operated, for example, coaxially or biaxially as microscanners, with beam expansion, as offset coaxial lidar having partial flash, or as 2-D offset coaxial systems having a deflection mirror used on both sides.

On the transmitting side, using micro-optical elements, such laser scanner systems produce beam expansion, which is not associated with angular loss. This beam expansion is used, on one hand, to increase the robustness of the system with regard to local soiling of transmitting objectives and/or echo-receiving objectives and, on the other hand, to increase eye safety and/or the possibility of being able to transmit more optical power within the limiting values stipulated by law. More transmittable power is, in turn, associated directly with an increase in the receivable signal-to-noise ratio or an increase in the maximum measuring distance.

For example, microscanner systems are known, in which a transmitted beam is deflected onto different optical elements of a microlens set-up, using an alternating motion of a micromirror. Using each microlens of such a microlens set-up, a divergent transmitted beam is projected onto a transmitting and/or receiving lens, before the transmitted beam is able to exit the microscanner system in expanded form. After the reflection and/or scattering by an object situated in the field of view, the signal travels through the transmitting and/or receiving lens again and is deflected by different optical elements onto the detector.

An inherent challenge of these microscanners is the fact that in the case of scanning on the transmitting side, the tolerance of the scanning beam deflection unit, e.g., a mirror galvanometer or micromirror, has a direct effect on the angle of deflection of the transmitted beam in the field of view of the microscanner. Due to this, it is not unequivocally possible to strike a defined object point in the field of view. Thus, the light being scattered back from this object point is also no longer directly assignable to an angle in the field of view. This is associated with a reduction in the maximum resolution of the system and the accompanying detection reliability. For example, tolerances of the scanning beam deflection unit may occur by way of the driving circuit control, via restoring hystereses, via dynamic deformation based on the mass moment of inertia, via static deformation of a mirror through manufacturing operations, and due to shock situations.

SUMMARY OF THE INVENTION

According to a first aspect, the present invention relates to a module for a lidar sensor. A unit of a sensor, which may be integrated structurally and functionally in the sensor, is presently understood as a "module." The module contains a light transmitting path, which includes a light source, e.g., a laser source, and a movable mirror, e.g., a mirror galvanometer and/or a micromirror. The light transmitting path may include further optical elements, such as a collimating and/or focusing lens, and/or a deflecting reflector, in order to generate a first light beam having a spot of a predefined diameter; the microlens set-up being situated downstream from the light transmitting path. In other words, the microlens set-up is situated between a field of view and the light transmitting path. Due to the structural layout of the optical elements contained in it, the light transmitting path is configured, in particular, to illuminate a first microlens of the microlens set-up from the input side, using a first light beam whose spot diameter is predefined. In this case, the spot, which has the first predefined diameter and strikes the first microlens, possesses a diameter, which is greater than a diameter of the first microlens.

In particular, a microlens set-up of the present invention may include 200 to 50,000 microlenses. In addition, the predefined diameter of the spot is fixed, in particular, by the structural layout of optical elements in the light transmitting path. The diameter of the spot of the predefined, first light beam may be, in particular, 10 $\mu$m to 5 mm. The diameter of the first microlens may lie, in particular, in the same range, but is always smaller than the diameter of the spot. Inside of the microlens set-up on the transmitting side, the distance between edges of adjacent microlenses and an edge of the first microlens corresponds to the difference between the predefined diameter of the spot of the first light beam, which illuminates the microlens, and the diameter of the first microlens. The region consequently formed between the microlenses may include a nontransparent material and/or may be coated with a nontransparent material, which means that such a region acts as a screen about the microlenses. If the predefined diameter of the spot of the first light beam is too large, then an adjacent microlens may possibly be illuminated by this beam, which is to be prevented according to the present invention. If the diameter of the first beam is less than, that is, less than or equal to the diameter of the first microlens, then there is a risk that the microlens is not completely illuminated. The same considerations are valid for the distance between the first microlens and the adjacent microlenses. In this manner, a spot of light, which results from the first light beam and, in particular, completely illuminates the first microlens, may be prevented from illuminating one of the adjacent microlenses.

Consequently, the light beam emitted through the first microlens, into the field of view of the sensor, may be assigned to the first microlens. Thus, owing to the above-described, first light beam having the predefined spot diameter, via which the microlens is illuminated, as well as to the distance from the microlens to adjacent microlenses, the angular robustness of the sensor may be increased. In other words, the diameter of the first light beam and the spacing of the microlenses among themselves may ensure that a specific light beam completely illuminates only one microlens. Therefore, the tolerance susceptibility regarding the factors discussed at the outset may be reduced. Consequently, defined spot positions in the field of view, which result in uniform resolution, may be generated by the microlens set-up of the present invention. The environment described above, that is, distances of adjacent microlenses from the first microlens, and/or illumination of the first microlens, using the dimensions as described above, are subject to, for example, a long-range order, which means, in other words, that the principle described for the first microlens may basically continue for the entire microlens set-up, that is, for the adjacent microlenses and their adjacent microlenses, etc. The adjacent microlenses may be situated, in particular, on the vertices of a square, which encompasses the first microlens.

Microlens set-ups, which are generally used in the related art, have the densest two-dimensional packing with regard to the spacing of the microlenses among themselves. However, when the microlenses are illuminated, this reduces the uniqueness of a spot assignment, since due to the tolerances discussed at the outset, a plurality of microlenses may be illuminated completely or partially by a spot of reduced size. This problem is overcome by the present invention, in that, due to the module of the present invention and the predefined diameter of the spot of the first light beam, as well as to the distance between the microlenses, only one microlens is illuminated per light beam.

The further embodiments show further refinements of the present invention.

According to a further refinement of the present invention, the transmitting-side microlens set-up is positioned between the light transmitting path and an objective. The objective is configured to guide, in a spatial direction, an output-side, first light beam, that is, a light beam, which has been supplied, initially on the input side, to the first, transmitting-side microlens, with the predefined spot diameter of the first light beam, and has therefore passed through the first microlens. The objective may include, in particular, a projection lens. In addition, the objective may be configured to act as a transmitting and receiving lens inside of the module of the present invention. Since the illumination of a microlens is unequivocal with regard to the tolerances, the light beam emanating from this microlens may be guided to a defined point of the field of view of the sensor. Consequently, a uniform and continuous resolution with regard to an object to be detected or an object region may be attained. The transparent aperture of the objective may have, in particular, a diameter, which is greater than the standardized pupil diameter of the human eye, and is, e.g., sensibly, 50 mm.

According to a further refinement, the distance between the objective and the first microlens may be less than or equal to the sum of the focal lengths of the objective and the microlens. If the distance corresponds to the sum of the two focal lengths, then the objective emits a plane-parallel light beam. In the other case, the object emits a divergent light beam. In other words, this means that a beam already expanded by the first microlens may be expanded further by the objective. In this manner, for example, a spot size may be expanded, using an arbitrarily adjustable beam divergence, which is limited, e.g., by the field of view of the objective. In this manner, in particular, eye safety is maintained; the diameter of the human pupil, which forms the basis of the criterion for eye safety, is 7 to 8 mm, since due to the larger output spot emitted from the module, the eye is exposed to a lower power output. Through the additional beam expansion of the objective, an object nearly as large or small as desired may additionally be illuminated substantially completely.

According to another advantageous further refinement, the present invention relates to a detector-side microlens set-up. This detector-side microlens set-up may be situated upstream from a light receiving path; the light receiving path being able to include optical elements, such as focusing lenses and/or collimating lenses and/or a movable mirror, by which a received light beam is guided to a detector. In addition, optical elements of the light transmitting path, such as a movable mirror, may also be used for the light receiving path. According to the present invention, it may be provided that the same objective be used for both the transmitting and the receiving paths. In particular, the diameter of the microlenses of the receiving-side microlens set-up may correspond to the sum of the diameter of the microlenses of the transmitting-side microlens set-up and the spacing of adjacent microlenses of the transmitting-side microlens set-up. In this manner, in order to maximize the detection of the received signal without loss of power, the highest packing density of the microlenses and, consequently, a transparent surface that is as large as possible, may be attained again on the receiving side.

According to a further advantageous refinement of the module according to the present invention, a gap between the first microlens and the adjacent microlens inside the transmitting-side microlens set-up includes a nontransparent material. Thus, this is particularly advantageous for absorbing the radiation of the spot, which is not transmitted by the microlens and is not guided onto the objective and, consequently, not guided onto a field of view; and therefore, this is particularly advantageous for preventing unintentional illumination of the field of view outside of the beam transmitted from the transmission spot, through the microlens. In addition, in view of eye safety standards, the emittable transmission power may therefore be increased in comparison with a module not having nontransparent material between the microlenses, and consequently, a greater range is attained.

According to an advantageous refinement of the module of the present invention, the diameter of the second microlens corresponds to the diameter of the spot of the first light beam.

It is also advantageous for the first microlens to be configured to produce a beam expansion of an outgoing light beam, the diameter of the outgoing light beam corresponding to at least the first predefined spot diameter. This may be achieved, in particular, as a function of the distance between the objective and the microlens set-up. In this manner, a light beam of the same diameter may be received via the same objective after being reflected by an object. Consequently, the present invention may attain an increase in the robustness of the transmitting and receiving objective with regard to soiling.

The beam expansion of the present invention on the basis of the first microlens may allow a compact type of construction of a lidar sensor to be achieved.

According to another advantageous further refinement, the predefined diameter of the spot of the first light beam may be determined by a structural layout of the light transmitting path. In other words, a distance between the microlenses of the lens optics may be determined in a configuration of a module of the present invention. As a function of that, structurally, that is, by equipment, e.g., by the positioning of a laser, a movable mirror, a collimator, and a deflecting reflector, a spot of a first light beam may be generated to have a predefined diameter; the predefined diameter being greater than the diameter of the microlenses. In particular, the microlenses of the microlens set-up of the present invention have a substantially uniform diameter for all of the embodiments and further refinements of the present invention.

Accordingly, the following aspects of the present invention include the advantageous embodiments and further refinements having the features as mentioned above, as well as the general advantages of the module of the present invention and the respective technical effects associated with them. Therefore, in order to avoid repetition, a new listing is omitted.

A second aspect of the present invention relates to a lidar sensor including a module according to the first aspect of the invention. The lidar sensor has, in particular, a transmitting region, which includes, in particular, the light transmitting path described above and the transmitting-side microlens set-up.

In addition, the lidar sensor has, in particular, a receiving unit, which includes, in particular, the detector-side microlens set-up described above. In this connection, optical elements of the receiving unit may also be used for the transmitting unit, and vice versa.

In the following, exemplary embodiments of the present invention are described in detail with reference to the accompanying drawings.

DETAILED DESCRIPTION

Figure 1:
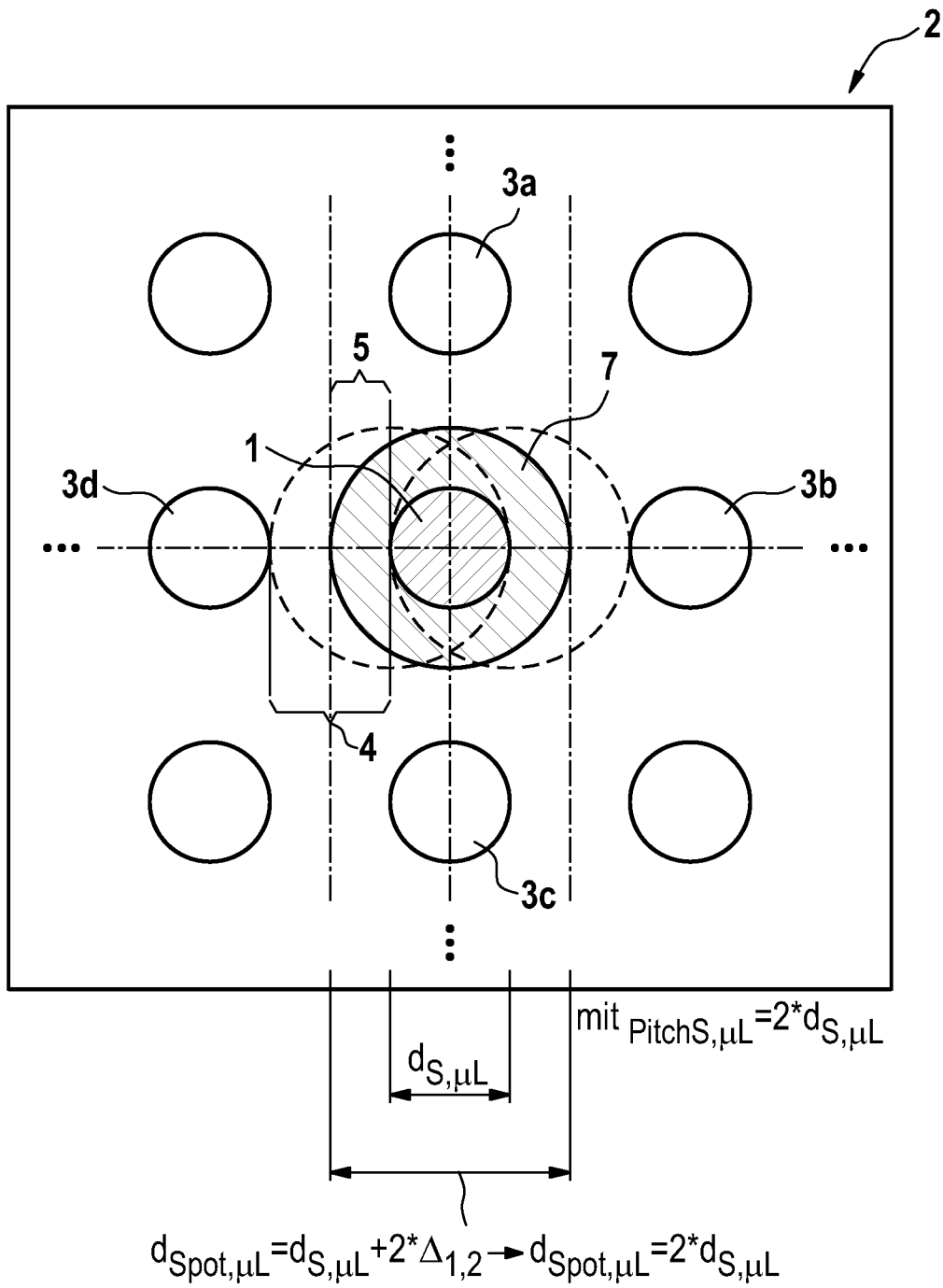
FIG. 1 shows a cross-sectional view of a variant of a transmitting-side microlens set-up according to the present invention.

FIG. 1 shows a cross-sectional view of a variant of a microlens set-up 2 according to the present invention. A first microlens 1, which is shown with hatching, has a diameter $d_{S,\mu L}$, which, ideally, is to be illuminated completely. The predefined diameter $d_{Spot,\mu L}$ of a spot 7 of a first light beam, which strikes microlens set-up 2, is greater than the diameter $d_{S,\mu L}$ of first microlens 1. A pitch, that is, a distance between a center of a circle of a first microlens 1 and a center of a circle of an adjacent microlens 3b is, in the present case, two times the microlens diameter $d_{S,\mu L}$. Expressed in a general manner, distance 4 from the edge of a first microlens 3a to the edge of an adjacent microlens 3d corresponds to the difference of $d_{Spot,\mu L}$ and $d_{S,\mu L}$. In this manner, first microlens 1 is uniquely illuminated in an intended tolerance range.

Figure 2A:
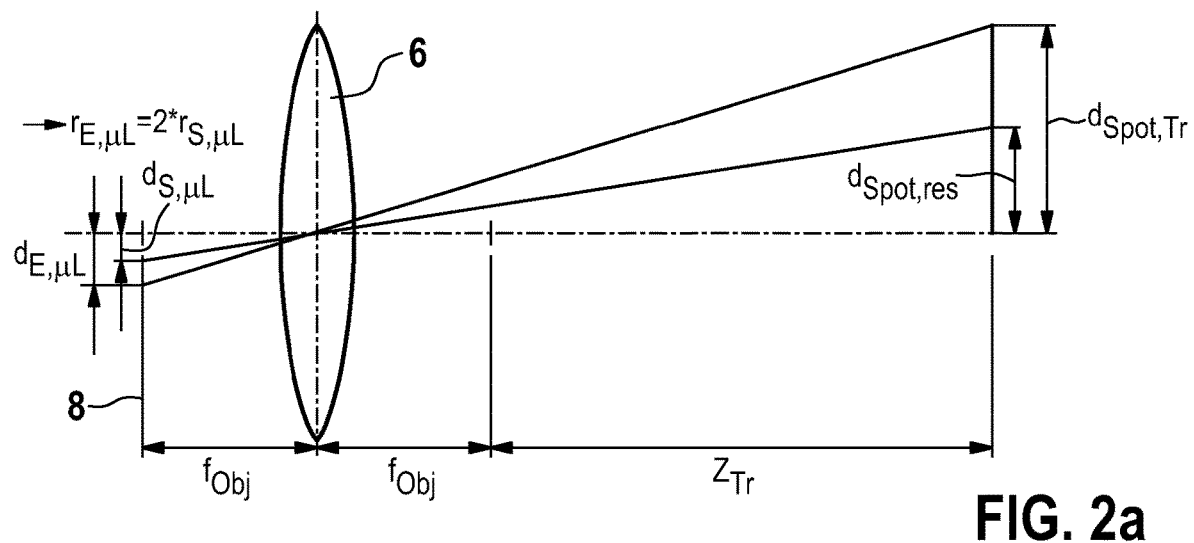
FIG. 2a shows a side view of a variant of a light receiving path according to the present invention.

FIG. 2a shows a layout of an objective 6 and a receiving-side microlens set-up 8. In this connection, $f_{Obj}$ represents the focal length of objective 6. In this case, the distance of receiving-side microlens set-up 8 from the objective is less than the sum of the focal lengths of objective 6 and receiving-side, second microlens 9, in order to receive a spot having diameter $d_{Spot,Tr}$. In this connection, $Z_{Tr}$ is the distance between the object 21 to be measured and the focal length $f_{Obj}$ of the objective. In this connection, optical paths of beams reflected by an object 21 are shown. In this case, $d_{Spot,Tr}$ is the beam diameter, which is actually reflected by an object 21 and must be spanned, in order not to generate any gaps or unilluminated regions in the field of view, in the case of microlenses positioned on the transmitting side so as to have a spacing 4 (the area between the microlenses being nontransparent). Starting out from $d_{Spot,Tr}$, after passing through objective 6, the reflected beam would be imaged on a receiving-side microlens set-up, so as to have a diameter $d_{E,\mu L}$. In order not to reduce, through this, the system resolution (which is determined by $res_{TR}$ and the diameter $d_{Spot,res}$ associated with it), the now larger spot must be resolved on the detector side. On the other hand, $d_{S,\mu L}$ is the diameter of first microlens 1. In this case, it becomes clear that at such a $d_{E,\mu L}$ ($d_{E,\mu L}=d_{S,\mu L}$), only a portion of spot $d_{Spot,Tr}$, which is reflected by the object, could be imaged on a detector, since the rest of the backscattered, received signal would then be absorbed or reflected by the screen between the microlenses. In this manner, the maximum possible received signal would be reduced.

Consequently, in this case, it is useful for $d_{E,\mu L}$ of second microlens 9 to correspond to diameter $d_{Spot,\mu L}$ of the first transmitting-side light beam.

Figure 2B:
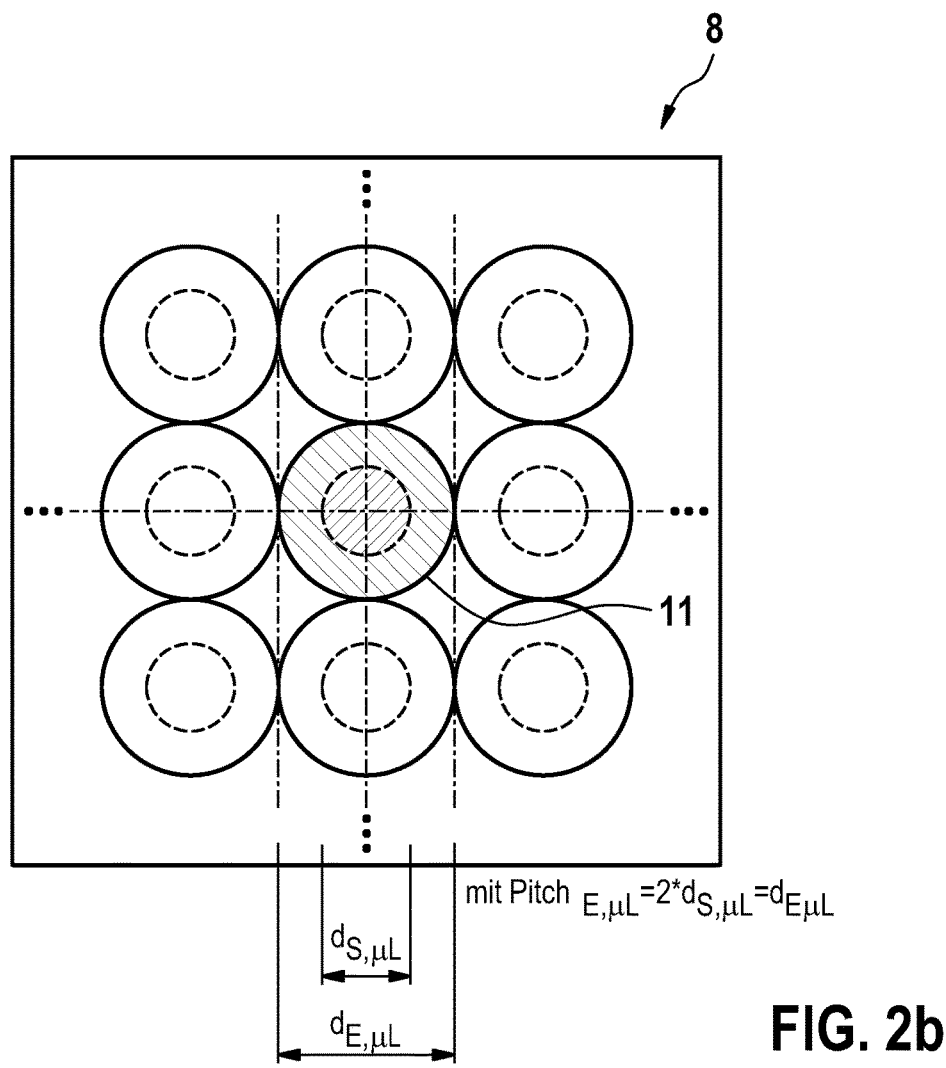
FIG. 2b shows a cross-sectional view of a variant of a receiving-side microlens set-up according to the present invention.

FIG. 2b shows a cross-sectional view of a receiving-side lens set-up 8, by which the challenge discussed in the last paragraph is solved. In this connection, diameter $d_{S,\mu L}$ of a second microlens 9 of a receiving-side microlens set-up 8 is increased to diameter $d_{E,\mu L}$. In this manner, the power loss at a receiving-side microlens set-up 8 may be decreased, and a maximum received signal may be detected.

Figure 3:
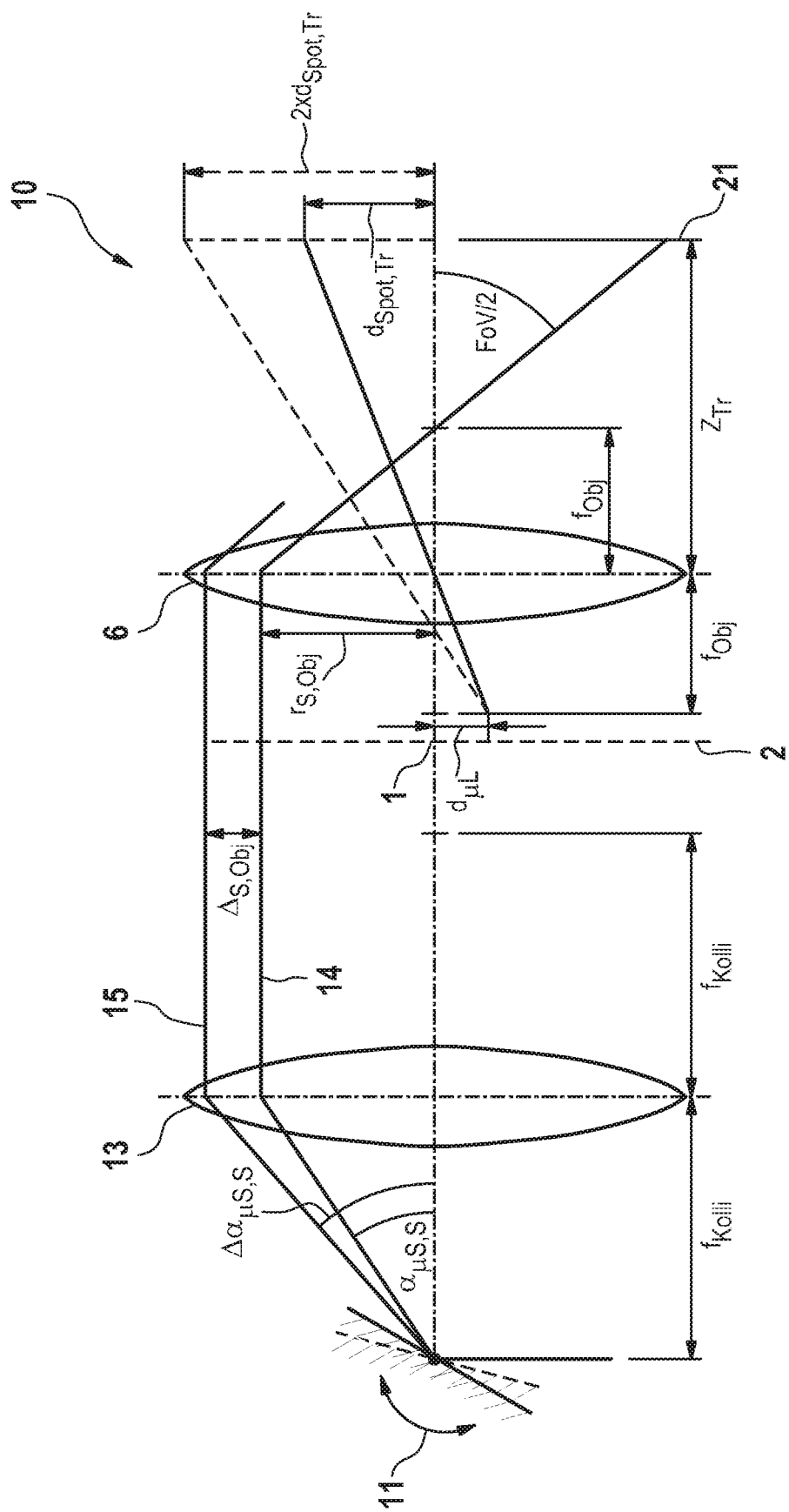
FIG. 3 shows a side view of a variant of a transmitting path according to the present invention.

FIG. 3 shows a variant of a module 10 of the present invention, including a micromirror 11 and a collimator 13, at whose focal distance $f_{Kolli}$ micromirror 11 is positioned. In this connection, an ideal angle $\alpha_{\mu S,s}$ of a first light beam 14 is indicated, which is guided onto transmitting-side microlens set-up 2. However, using an actual tolerance of micromirror 11, the ideal angle $\alpha_{\mu S,s}$ here is changed by the magnitude of angle $\Delta\alpha_{\mu S,s}$, from which a second light beam 15 results, which strikes a different position on transmitting-side microlens set-up 2.

Thus, the spatial path of second light beam 15 shifts with respect to first light beam 14 by the amount $\Delta_{S,Obj}$. Accordingly, the uniqueness of the transmitting-side assignment of the light beam also decreases. However, this problem is solved by the illumination of the present invention shown above and the associated distances of adjacent microlenses 3a through 3d from first microlens 1. Using the illumination of the present invention, a first microlens 1 illuminated according to the present invention produces, on the output side, a spot of size $d_{Spot,Tr}$ on object 21. If the entire spot 7, which illuminates first microlens 1 and its surrounding area, were to exit the system, then this would result in both the illumination of object 21 and highly divergent, scattered light, which would enter the field of view. This leads to a reduction in the maximum transmittable power at the output of the objective due to reasons of eye safety. However, using the transmitting-side microlens set-up 2 of the present invention, the portion of spot 7, that is, the overlap, which does not pass through microlens 1, is absorbed or reflected back into the system, that is, into module 11.

Figure 4:
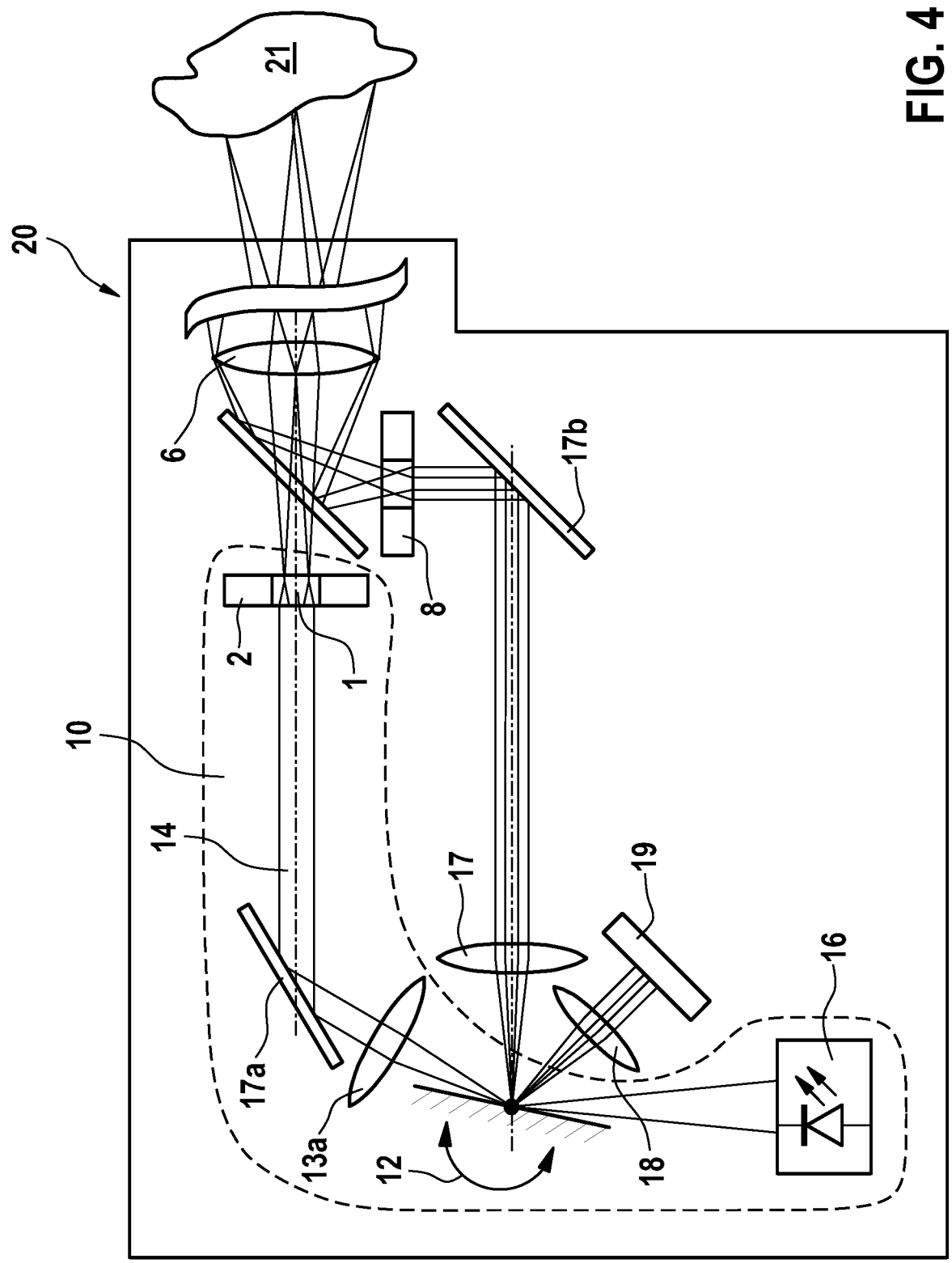
FIG. 4 shows a variant of a lidar sensor according to the present invention.

FIG. 4 shows a variant of a lidar sensor 20 of the present invention, including a module 10 of the present invention 10. In addition to the explanations above, lidar sensor 20 of the present invention includes a laser source 16 and a first and a second deflecting reflector 17a, 17b. Also, a detector 19 is provided on the receiving side. Furthermore, a collimating lens 22 and a focusing lens 18 are situated in the receiving region.

What is claimed is:

1. A module for a lidar sensor, comprising:
a light transmitting path having a movable mirror and a light source; and
a transmitting-side microlens set-up, which is situated downstream from the light transmitting path;
wherein the light transmitting path is configured to illuminate a first microlens of the transmitting-side microlens set-up on the side of the light transmitting path, using a spot of a first light beam, the spot having a predefined diameter, and
wherein the predefined diameter of the spot is greater than a diameter of the first microlens, and a distance of an edge of the first microlens to edges of adjacent microlenses inside of the transmitting-side microlens set-up corresponds to a difference between the predefined diameter of the spot of the first light beam and the diameter of the first microlens.

2. The module of claim 1, wherein the transmitting-side microlens set-up is situated between the light transmitting path and an objective, and wherein the objective is configured to guide a first light beam coming out of the transmitting-side microlens set-up in a spatial direction.

3. The module of claim 2, wherein a distance between the objective and the first microlens is less than or equal to a sum of focal lengths of the objective and the microlens.

4. The module of claim 1, further comprising:
a detector-side microlens set-up to receive light beams reflected by an object, and including a second microlens; wherein a distance of an edge of the second microlens to edges of adjacent microlenses inside of the detector-side microlens set-up is less than the spacing within the transmitting-side microlens set-up, and a diameter of the second microlens is greater than the diameter of the first microlens.

5. The module of claim 4, wherein the diameter of the second microlens corresponds to the diameter of the spot.

6. The module of claim 1, wherein inside of the transmitting-side microlens set-up, a space between the first microlens and the adjacent microlenses contains a nontransparent material.

7. The module of claim 1, wherein the predefined diameter of the spot of the first light beam is two times the diameter of the first microlens.

8. The module of claim 2, wherein the first microlens is configured to generate an outgoing light beam having beam expansion and to project it onto the objective, and wherein in the case of striking the objective on a transmitting side, a diameter of the outgoing light beam having beam expansion corresponds to at least the predefined diameter of the spot of the first light beam.

9. The module of claim 1, wherein the predefined diameter of the spot of the first light beam may be determined by a structural layout of the light transmitting path.

10. A lidar sensor, comprising:
a module, including:
a light transmitting path having a movable mirror and a light source; and
a transmitting-side microlens set-up, which is situated downstream from the light transmitting path;
wherein the light transmitting path is configured to illuminate a first microlens of the transmitting-side microlens set-up on the side of the light transmitting path, using a spot of a first light beam, the spot having a predefined diameter, and
wherein the predefined diameter of the spot is greater than a diameter of the first microlens, and a distance of an edge of the first microlens to edges of adjacent microlenses inside of the transmitting-side microlens set-up corresponds to a difference between the predefined diameter of the spot of the first light beam and the diameter of the first microlens.

* * * * *